July 26, 1949.                    C. L. BROWNLOW                    2,477,172
                              SEISMOMETER CASE COVER
                                 Filed Feb. 6, 1948
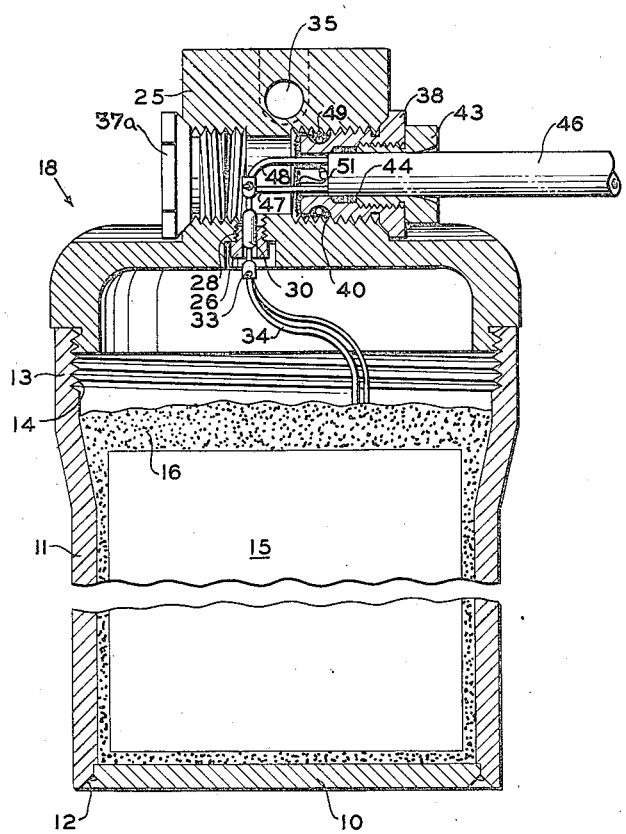
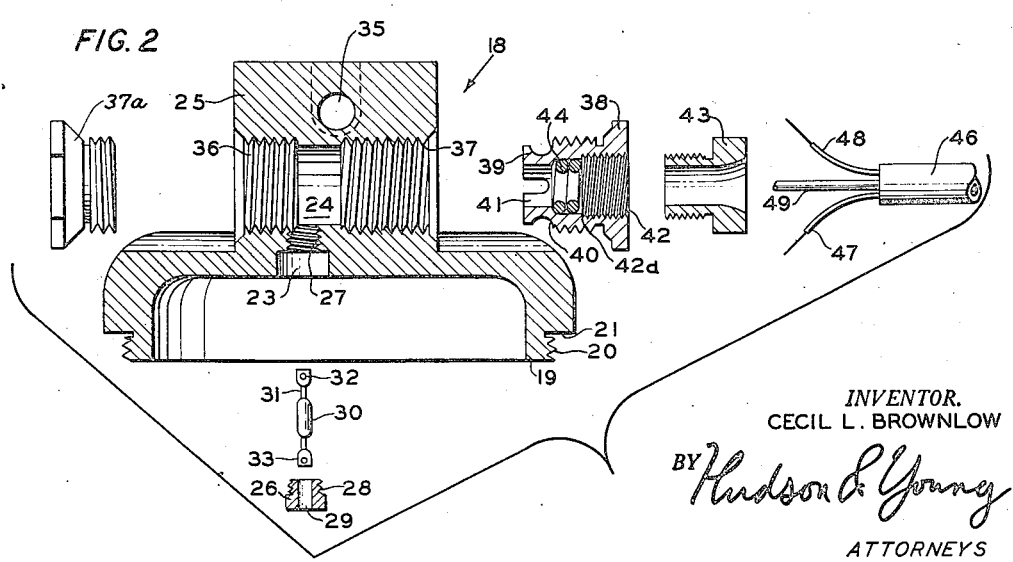
INVENTOR.
CECIL L. BROWNLOW
BY Hudson & Young
ATTORNEYS Patented July 26, 1949

2,477,172

UNITED STATES PATENT OFFICE 2,477,172

SEISMOMETER CASE COVER

Cecil L. Brownlow, Bartlesville, Okla., assignor to Phillips Petroleum Company, a corporation of Delaware Application February 6, 1948, Serial No. 6,577

5 Claims. (Cl. 174—77)

This invention relates to cable anchoring and sealing assemblies. In a more specific aspect, this invention relates to seismometer cases and covers therefor which include the novel anchoring and sealing assemblies.

In apparatus such as seismometers, a case must be provided which is water tight, as even small amounts of moisture are extremely harmful to the delicate parts of the seismometer. Thus, the cable carrying the seismometer leads must be carefully sealed at the region where is extends into the case to exclude moisture therefrom. Further, the cable must be securely anchored to the case to prevent damage caused by excessive strain on the conductors due to careless handling. In the field, seismometer operators oftentimes lift and handle the seismometer case by grasping the cable leading thereto, which was a frequent cause of breakage of the cable in prior seismometer units. Finally, as with all field equipment, provision of a light weight assembly is very desirable.

The seismometer cable anchoring and sealing assembly, in combination with the cover described herein, meets all the requirements hereinbefore noted and, hence, is particularly adapted for use in combination with a seismometer case. However, the anchoring and sealing assembly itself is of general application and may be used, either by itself or in combination with the cover, to provide a sealed cable connection which is securely anchored to a support.

It is an object of the invention to provide an improved sealed cable assembly.

It is a further object of the invention to provide a sealed cable assembly which may be positively anchored to a support.

It is a still further object of the invention to provide a light weight closure cap embodying the novel cable anchoring and sealing assembly.

It is a still further object of the invention to provide an improved seismometer case which is water tight, of light weight, and has a cable assembly securely anchored thereto.

Various other objects, advantages, and features of the invention will become apparent from the following detailed description taken in conjunction with the appended drawings, in which:

Figure 1 is a vertical sectional view, partly in elevation, of the seismometer case including the novel cable anchoring and sealing assembly; and Figure 2 is a sectional view of the closure cap and cable assembly with the parts in disassembled relation.

Referring now to the drawings in detail, I have illustrated the novel cable anchoring and sealing assembly in connection with a seismometer case, and cover therefor. As shown by Figure 1, the case comprises a base 10 which is welded to a cylindrical casing 11 along a mitered joint 12. The case is swaged at the top thereof to provide an enlarged upper end 13 which is screw-threaded at 14 to receive a suitable closure cap or cover. The case is advantageously formed from aluminum to provide a light leak-proof assembly. Mounted within the case is a seismometer unit, which is indicated schematically at 15. The constructional details of this unit are not shown since they form no part of the present invention. A layer of wax 16 is applied to the top of the seismometer unit 15 and serves to provide a moisture-proof seal for the delicate parts of the seismometer.

A closure cap or cover 18 is provided for fitting into the top of the seismometer case and this cap has a downwardly protruding annular part 19 which is provided with threads 20 for engaging and forming a sealed joint with the threads 14. A shoulder 21 is formed adjacent the threads 20 and this shoulder engages the rim of the casing 12 to provide an additional leak-proof joint between the closure cap and the seismometer case. In order to provide a light weight assembly, it is desirable that the cap 18 be formed from aluminum.

A pair of openings, one of which is shown at 23, are provided at the top of the closure cap 18, preferably in the central region thereof. Both openings 23 communicate with a transverse cylindrical passage 24 formed in a housing 25 which is integral with the cover 18. Each opening 23 is shaped to receive a brass plug 26 and is provided with threads 27 for engaging complementary threads 28 on the plug. A central aperture 29 is formed in each plug and a glass bead insulator 30 is seated in this aperture. In such seated position, a seal is effected between the insulator and the plug, and, when the plug is threaded into the opening 23, a sealed joint is provided between the threads 27 and 28. Extending through each insulator 30 is a strip 31 of conductive material which has terminal portions 32, 33 for making an electrical connection between the interior of the seismometer case and the transverse passage 24. The terminal portions 33 are connected to leads 34 which extend, respectively, through the wax layer 16 into the seismometer unit 15. As an optional feature, the cover may be provided with a hole 35 to receive a rope or cable for supporting the seismometer.

The transverse passage 24 is provided with threads 36, 37 at the respective ends thereof and a threaded plug 37a is insertable into the threads 36 for closing and sealing the adjacent end of the passage 24. Engageable with the threads 37 is a threaded sealing member 38 for closing and sealing the other end of the passage 24. The member 38 has a reduced inner portion 39 which is provided with a circumferential groove 40 for a purpose to be hereinafter explained. The member 38 is also shaped to form a longitudinal bore 41 having an enlarged interiorly threaded outer portion 42 extending inwardly to a shoulder 42a. An apertured, threaded sealing plug 43 is insertable into the enlarged part 42 of the bore and, in its inserted position, the plug 43 is engageable with a body of soft metal 44, which preferably consists of one or two turns of lead wire.

A sheathed cable 46 extends through the aperture in sealing plug 43 and the bore in member 38 into the central part of the passage 24. This cable comprises a pair of conductors 47, 48 and a cord 49 which is interwoven with said conductors. The conductors 47, 48 are attached to the respective terminal portions 42 of the glass bead insulators 30 and it will be apparent that, in this manner, the conductors are electrically connected with the leads 34 extending into the seismometer unit 15.

In assembling the cable and seismometer unit, the leads 34 are attached to the respective conductor portions 33 of the insulators 30 and these leads are twisted a number of turns equal to the number of threads 20 on the cover. Thereupon, the plugs 26 are screwed into the openings 23 and the cover 19 is screwed into position upon the seismometer case 12. In screwing the cover upon the case, the leads 34 will become untwisted so that there is substantially no capacitive nor inductive effect therebetween. Thereupon, the cable 46 is inserted through the aperture in sealing plug 43 and the bore in sealing member 38 so that the conductors 47, 48 and cord 49 extend into the passage 24. The cord 49 is then twisted around and placed in the groove 40 after which a mass of sealing material 51 is applied to hold the cord in position. Preferably and desirably, the material 51 also seals the area between the sheath of cable 46 and the inner end of the member 38. In this manner, the cable is effectively anchored to the member 38.

The member 38 is then screwed into position upon the threads 37 and the conductors 47, 48 are soldered or otherwise suitably secured to the terminal portions 32, respectively. For this purpose, access may be had to the insulators 30 through the opening defined by the threads 36. Thereupon, the plug 37a is inserted to close and seal the adjacent end of passage 24 and plug 43 is screwed into the enlarged portion 42 of the bore 41, thereby compressing the soft material 44 and causing it to flow into the sealing engagement with the sheath of the cable and the shoulder 42a.

It will be apparent that the disclosed case and cover assembly afford a number of important advantages. Thus, a completely water tight seal is effected for the cable and conductors 47, 48 at the region where they enter the seismometer assembly. This seal is effected by the glass bead insulators 30 in combination with the sealing material 50 at the inner end of member 38 and the soft flowable metal 44 at the shoulder 42a, the seal effected by the plug 43 being particularly effective in excluding moisture from the interior of the seismometer unit 15. Further, the anchoring of the cord 49 at the inner end of the member 38 provides a firm, secure support and eliminates the possibility of undue strain being imposed upon the conductors 47 and 48. With the described construction, the whole unit may be readily lifted by means of the cable 46 without straining or damaging the conductors or other apparatus. Finally, by making the case and the cover of aluminum, a very compact and light weight assembly is obtained.

It will be apparent that the cable anchoring and sealing assembly comprising the sealing member 38, plug 43 and cable 46, has utility independently of the cover and the seismometer case for securing and sealing a cable in diversified types of electrical apparatus. Moreover, the combination of this sealing and anchoring assembly with the cap 18 is also useable with apparatus other than a seismometer case. However, the described structure is highly advantageous when used in connection with a seismometer assembly and adequately fulfills the exacting requirements necessary in this type of apparatus.

Although the invention has been described in connection with a preferred embodiment thereof, this description is not intended to limit the invention, the scope of which is defined by the appended claims.

What is claimed as new is:

1. A metal closure cap assembly including, in combination, a base having a pair of openings formed therein, a glass bead insulator sealing each of said openings, a conductor extending through each insulator and having a terminal portion at each end thereof, a housing protruding from the top of said base and having a transverse passage formed therein communicating with both of said openings, a plug for closing and sealing one end of said passage, a sealing member for closing and sealing the other end of said passage, said sealing member having a part thereof protruding into said passage, there being a longitudinal bore formed in said sealing member with an enlarged outer portion, a sheathed cable extending through the bore in said sealing member, a body of soft metal in the enlarged portion of said bore, means compressing said soft metal into sealing engagement with said sealing member and the sheath of said cable, said cable including a pair of conductors secured to the respective terminal portions of said glass bead insulators and a cord extending into said cylindrical passage and tied to the inwardly protruding part of said sealing member, and means sealing the inner end of said bore and securing said cord to said inwardly protruding part.

2. A seismometer case comprising, in combination, a fluid tight container for receiving a seismometer, a metal closure cap secured to said container, said cap having a pair of openings formed therein, a glass bead insulator sealing each of said openings, a conductor extending longitudinally through each insulator and having a terminal portion at each end thereof, a housing protruding from the top of said cap and having a transverse cylindrical passage formed therein communicating with both of said openings, a plug for closing and sealing one end of said passage, a sealing member for closing and sealing the other end of said passage, said sealing member having a reduced inner portion protruding into said passage, there being a longitudinal bore formed in said sealing member with an enlarged outer portion, an apertured sealing plug fitted into the enlarged outer portion of said bore, a sheathed cable extending through the aperture in said sealing plug and the bore in said sealing member, a body of soft metal in said bore, said sealing plug being in pressure engagement with said soft metal to force it into sealing engagement with the cable sheath, said cable including a pair of conductors secured to the respective terminal portions of said glass bead insulators and a cord extending into said cylindrical passage and tied to the reduced inner portion of said sealing member, and a mass of sealing material sealing the inner end of said bore and securing said cord to said reduced portion.

3. A seismometer case comprising, in combination, a fluid tight container for receiving a seismometer, a metal closure cap screw threaded to said container, said cap having a pair of openings formed in the central portion thereof, an apertured plug in each opening, a glass bead insulator fitting into and sealing each aperture, a conductor extending longitudinally through each insulator and having a terminal portion at each end thereof, a housing protruding from the top of said cap and having a transverse cylindrical passage formed therein communicating with both of said openings, screw threads formed on the inner walls of said passage, a threaded plug for closing and sealing one end of said passage, a threaded sealing member for closing and sealing the other end of said passage, said sealing member having a reduced inner portion protruding into said passage, a circumferential groove formed on said inner portion, there being a longitudinal bore formed in said sealing member with an enlarged interiorly threaded outer section, a threaded apertured sealing plug fitted into the threaded section of said bore, a sheathed cable extending through the aperture in said sealing plug and the bore in said sealing member, a body of soft metal in the threaded portion of said bore, said sealing plug being in pressure engagement with said soft metal to force it into sealing engagement with the sheath of said cable, said cable including a pair of conductors secured to the respective terminal portions of said glass bead insulators and a cord extending into said cylindrical passage and tied to the grooved portion of said sealing member, and a mass of sealing material sealing the inner end of said bore and securing said cord to said grooved portion.

4. A cable anchoring and sealing assembly comprising, in combination, a metal sleeve having an axial passage with a shoulder formed therein, a sheathed cable extending through said passage, said cable including a cord which is fixed to the inner end of the sleeve, a body of sealing material securing said cord in position and sealing the inner end of said sleeve, a body of flowable material in said passage adjacent said shoulder, and a sealing plug forcing said flowable material into sealing engagement with said shoulder and the sheath of said cable.

5. A cable anchoring and sealing assembly comprising, in combination, a threaded generally sleevelike sealing member having a reduced inner part with a circumferential groove formed therein, there being an axial passage through said sealing member having an enlarged threaded outer portion, a body of soft metal in said enlarged outer portion, an apertured plug screw threaded in said enlarged outer portion, a sheathed cable extending through said aperture and said passage, said plug being engageable with said soft metal to force it into sealing engagement with the cable sheath, and said cable including a cord tied around the grooved part of said sealing member, and a body of sealing compound sealing the inner end of said passage and securing the cord to said grooved part.

CECIL L. BROWNLOW.

REFERENCES CITED

The following references are of record in the file of this patent:

UNITED STATES PATENTS

| Number | Name | Date |
|---|---|---|
| 1,426,337 | Sperry | Aug. 15, 1922 |
| 2,177,508 | Abbott | Oct. 24, 1939 |
| 2,206,672 | Pederquist | July 2, 1940 |

FOREIGN PATENTS

| Number | Country | Date |
|---|---|---|
| 475,178 | Germany | Apr. 19, 1929 |
| 693,422 | Germany | July 8, 1940 |
| 783,796 | France | Apr. 15, 1935 |